F. EGERSDÖRFER.
ROTARY MACHINE.
APPLICATION FILED SEPT. 10, 1920.

1,422,946.

Patented July 18, 1922.

Fritz Egersdörfer,
Inventor
by Christy and Christy
his attorneys

UNITED STATES PATENT OFFICE.

FRITZ EGERSDÖRFER, OF CHARLOTTENBURG, GERMANY.

ROTARY MACHINE.

1,422,946.        Specification of Letters Patent.        Patented July 18, 1922.

Application filed September 10, 1920. Serial No. 409,502.

(GRANTED UNDER THE PROVISIONS OF THE ACT OF MARCH 3, 1921, 41 STAT. L., 1313.)

*To all whom it may concern:*

Be it known that I, FRITZ EGERSDÖRFER, a citizen of Germany, residing at Charlottenburg, Germany, have invented certain new and useful Improvements in Rotary Machines (for which I have filed application in Germany, Aug. 25, 1913; in Sweden, Apr. 22, 1919, Patent No. 46,625, Mar. 3, 1920; in Denmark, Apr. 28, 1919; in Switzerland, May 10, 1919; in Norway, May 16, 1919; in France, May 30, 1919; in Holland, June 6, 1919; in Spain, June 12, 1919; in Czecho-Slovakia Oct. 1, 1919); and I do hereby declare the following to be a full, clear, and exact description of the invention, such as will enable others skilled in the art to which it appertains to make and use the same.

My invention relates to improvements in rotary machines, and more particularly in machines of that class in which a rotary piston provided with radially movable blades is eccentrically mounted within a stationary casing. In order to reduce the friction of the radially movable blades it has been proposed to guide the said blades at their ends between disks which take part in the rotation of the piston, and the said disks have for this purpose been fixed to the piston. Such guide members or disks have also been made integral with the piston, and in such cases the casing enclosing the piston has been axially divided in order to permit the piston to be mounted within the same. The object of the improvements is to provide a machine of this class, in which the blades are guided at their ends between lateral members which are integral with the piston, and in which the piston is mounted within a casing which is not axially divided. With this and other objects in view my invention consists in the matters to be described hereinafter and particularly pointed out in the appended claims. For the purpose of explaining the invention an example embodying the same has been shown in the accompanying drawing in which the same letters of reference have been used in all the views to indicate corresponding parts.

In said drawings—

In describing the invention reference will be made to an engine. But I wish it to be understood, that my invention is not limited to the embodiment shown in the figures, and that it equally applies to pumps or compressors.

Figure 1:
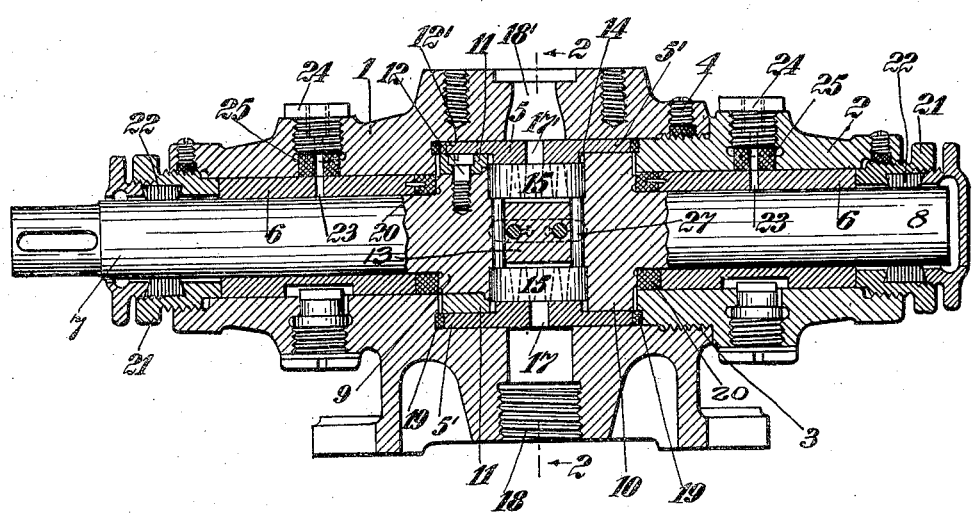
Fig. 1 is a longitudinal section of the machine.
Figure 2:
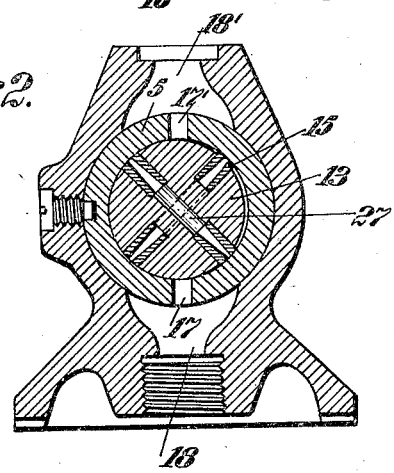
Fig. 2 is a cross section taken on the line 2—2 of Fig. 1.

In the example shown in the figures the casing of the machine consists of a main part 1 and a cylindrical part 2 which is screwed into the part 1 by screw threads 3 and fixed in its proper position by a set screw 4. An enlarged cylindrical chamber is formed by and between casing 1 and cylindrical part 2, and within this chamber a sleeve 5 is fitted whose cylindrical bore though axially parallel with is eccentrically placed relatively to the bearings for the piston shaft presently to be described. In the preferred form shown in the figures the sleeve 5 is provided at its ends with flanges 5′ by means of which it is securely held against rotation between shoulders provided by the parts 1 and 2 of the casing. The casings 1, 2 is provided with bushings 6 which afford bearings for a rotary shaft 7, 8. At the part which is located within the enlarged cylindrical chamber the shaft 7, 8 is formed with the piston parts 9, 10, 13 which are made integral with the shaft. In the example shown in the figures the diameter of the portion 10 of the piston corresponds to the inner diameter of the flange 5′ of the sleeve 5, and the portion 9 of the said piston is of such diameter that in assembling the machine the sleeve 5 can be pushed over the same. But the portion 9 is further provided with a removable and replaceable ring-like extension 11, which being for the purpose of assembly removed may after the sleeve 5 has been pushed over the piston be secured. For screwing the screws 12 into the piston holes 12′ are provided in flange 5′, as is shown in Fig. 1 in dotted lines. Between the outer portions 9 and 10 of the piston the part 13 is formed. It has, substantially radial slots or pockets, and the portions 9 and 10 and the ring 11 are formed at their inner sides with opposite radial grooves 14. The said pockets and radial grooves provide guideways for blades 15 which are adapted to be shifted within the pockets in such a way, that in the course of the rotation of the piston they are alternately withdrawn into the piston or projected therefrom, as is shown in Fig. 2. Such reciprocating removement of the blades is effected on piston rotation by the fact that the inner face of the sleeve is eccentrically disposed with respect to the axis of the turning of the piston, together with the fact that the blades are arranged in diametrically opposite pairs and are interconnected pair by pair by rods 27, the over-all length of each pair exceeding the diameter of the piston portion 13 and being substantially that of the bore of sleeve 5. By and between the inner face of the sleeve 5, the outer face of piston 13 and the blades 15, chambers are formed, the capacity of which is as the shaft rotates alternately reduced and increased, and the said chambers are adapted alternately to be brought in communication with ports 17 and 17', through which a fluid is admitted and discharged. For example, in case the machine is used as an engine, the driving fluid is admitted through the port 17 and allowed to escape through the port 17', and in case it is used as a pump or compressor the fluid to be pumped or compressed may be drawn in through the passage 17 and driven out through the passage 17'. The fluid is admitted to the port 17 and discharged from the port 17' through an inlet passage 18 and an outlet passage 18', which are connected with suitable pipes.

In case the machine is to be used with fluid under high pressure I prefer to form sleeve 5 with the lateral flanges 5' described, embracing the portions 9, 11 and 10 of the piston, so as to close the pressure chambers of the piston in a tight manner. Between the outer faces of the said flanges and the adjacent shoulders of the casings 1, 2, I may provide rings 19 of copper or other suitable material adapted to provide a tight packing. For the same reason I provide packing rings 20 between the bushings 6 and the adjacent faces of the portions 9 and 10 of the piston. By means of the said rings 19 and 20 the chamber formed by and between sleeve 5 and piston 13 is closed in a tight manner.

In assembling my improved machine the blades 15 are first placed within their pockets in the mid-portion 13 of the piston. Thereupon the sleeve 5 is shifted over the piston, until its right hand flange 5' fits over the piston part. The ring 11 is then pushed over the portion 9 of the piston and the screws 12 are screwed into the piston by inserting them through the holes 12' provided in the left hand portion 5' of the cam sleeve. After the piston, the blades 15 and the sleeve 5 have thus been assembled, the said parts are pushed from the right into the casing 1, whereupon the cylindrical portion 2 of the casing is screwed into the casing 1 and fixed therein by means of the set screw 4. By thus screwing the cylindrical casing 2 into the casing 1 the packing rings 19 are securely held between the shoulders of the casings 1, 2 and the sleeve 5 so as to produce a tight joint. The packing rings 20 are held in tight contact with their bearing faces on the portions 9 and 10 of the piston by means of sleeves 21 which are screwed into the casings 1, 2. By means of the said sleeves the pressure of the bushings 6 on the rings 20 can be adjusted according to the wear of the packing. Lubricant is admitted to the shaft 7 through bores 23 drilled through the bushings 6 and which communicate with perforations formed through screws 24 screwed in holes of the casings 1, 2. These screws press beneath them and upon bushings 6 and washers 25, in order that no fluid under pressure escaping from the piston chamber can leak out through the oil gland or escape along the shaft. The sleeves 21 are provided with suitable packing rings 22 in order to prevent loss of lubricant.

In the preferred form of the invention the rods 27 are adjustably fitted between the blades 15. Thereby the relative distance between opposite blades can be adjusted to the inner diameter of the cam sleeve 5, both initially, and in compensation for wear, so that a tight fit between the blades and the cam sleeve may always be maintained.

When the piston rotates within the sleeve the blades 15 are shifted radially within the grooves 14 formed in the portions 9 and 10 and the ring 11. The blades are held securely to slide in the piston throughout the cycle of rotation, and the pressure on the blades is directly transmitted,—either to rotate the shaft in response to fluid pressure, or to drive fluid in response to rotative force. The ring 11, secured by screws forms functionally an integral part of the piston and the groove in it part of the slot in which the blade slides.

I claim herein as my invention:

1. In a machine of the class described, the combination, with a rotary piston having at its ends radially projecting flanges one of which is formed as a ring removably secured to said piston, the said piston being provided between its flanges with substantially radial pockets, and blades mounted for reciprocation in said pockets, of a cylinder enclosing said piston and arranged eccentrically with respect thereto, upon the inner wall of which when the parts are assembled the said blades bear, said cylinder, piston, and blades forming chambers the capacity of which is alternately reduced and increased upon rotation of the piston, and a fluid inlet and outlet for said chambers.

2. In a machine of the class described, the combination, with a rotary piston having at its ends radially projecting flanges one of which is formed as a ring removably secured to said piston, said piston between said flanges being provided with substantially radial pockets, and blades mounted for reciprocation in said pockets, of a cylinder enclosing said piston, a sleeve within said cylinder and when the parts are assembled standing in eccentric position relative to said piston, the said blades engaging the bore of the sleeve, said sleeve, piston, and blades forming chambers the capacity of which is alternately reduced and increased upon rotation of the piston, and a fluid inlet and outlet for said chambers.

3. In a machine of the class described, the combination, with a rotary piston having at its ends radially projecting flanges one of which is formed as a ring removably secured to said piston, said piston between said flanges being provided with substantially radial pockets, and blades mounted for reciprocation in said pockets, of a cylinder enclosing said piston, a sleeve within said cylinder and when the parts are assembled standing in eccentric position relative to said piston, the said blades engaging the bore of said sleeve, said cylinder affording bearing for the sleeve at one end, a body secured to the cylinder and affording bearing for the said sleeve at the other end, said sleeve, piston, and blades forming chambers the capacity of which is alternately reduced and increased upon rotation of the piston, and a fluid inlet and outlet for said chambers.

4. In a machine of the class described, the combination, with a shaft, a rotary piston borne therein and having at its ends radially projecting flanges one of which is formed as a ring removably secured to said piston, said piston between said flanges being provided with substantially radial pockets, and blades mounted for reciprocation in said pockets, of a cylinder enclosing said piston, a sleeve within said cylinder and when the parts are assembled occupying an eccentric position relative to said piston, the said blades engaging the bore of said sleeve, said cylinder affording bearing for the sleeve at one end, a head secured to the cylinder, said cylinder and head being provided with bushings for said shaft and said head affording an opposite end bearing for said sleeve, said sleeve, piston, and blades forming chambers the capacity of which is alternately reduced and increased upon rotation of the piston, and a fluid inlet or outlet for said chambers.

5. In a machine of the class described, the combination with a rotary piston having at its end radially projecting flanges one of which is formed as a ring removably secured to said piston, the said piston between said flanges being provided with substantially radial pockets, and blades mounted for reciprocation in said pockets, of a cylinder enclosing said piston, a sleeve within said cylinder and when the parts are assembled standing in eccentric position relative to the piston, the said blades engaging the bore of the sleeve within, said sleeve being formed with flanges overlying the said flanges of the piston, said sleeve, piston, and blades forming chambers the capacity of which is alternately reduced and increased upon rotation of the piston, and a fluid inlet and outlet for said chambers.

6. In a machine of the class described, the combination with a rotary piston having at its ends radially projecting flanges one of which is formed as a ring removably secured to said piston, said piston between said flanges being provided with substantially radial pockets, and blades mounted for reciprocation in said pockets, of a cylinder formed of two cylindrical sections connected with each other and enclosing said piston, a sleeve within said cylinder and when the parts are assembled standing in eccentric position relative to said piston, the said blades engaging the bore of the sleeve within, said sleeve being formed with flanges overlying said flanges of the piston, the said sections of the cylinder provided with shoulders which engage said sleeve flanges, said sleeve, piston, and blades forming chambers the capacity of which is alternately reduced and increased upon rotation of the piston, and a fluid inlet and outlet for said chambers.

7. In a machine of the class described, the combination, with a rotary piston having at its ends radially projecting flanges one of which is formed as a ring removably secured to said piston, said piston between said flanges being provided with substantially radial pockets, and blades mounted for reciprocation in said pockets, of a cylinder formed of two cylindrical sections connected with each other enclosing said piston and provided internally with a sleeve which when the parts are assembled stands with bore in eccentric position relatively to the contained piston, the blades of the piston engaging the bore of the sleeve, bushings in said cylindrical sections abutting upon the said end flanges of the piston, means to adjust the bushings relatively to the piston, said sleeve, piston, and blades forming chambers the capacity of which is alternately reduced and increased upon rotation of the piston, and a fluid inlet and outlet for said chambers.

8. In a machine of the class described the combination of a rotary shaft, a piston integral with the shaft and arranged intermediate the length thereof, said piston consisting of enlarged terminal cylindrical portions and an intermediate cylindrical portion of smaller diameter, a slot extending diametrically through the cylinder throughout the length of the intermediate portion and part way through the length of the terminal portions, a blade extending through said slot and exceeding in its length the diameter of the intermediate portion of the piston, a cylindrical casing enclosing the intermediate portion of said piston with respect to which when the parts are assembled the piston is eccentric, the said casing consisting of an integral cylindrical body and a removable head, together with means (when the parts are assembled) for admitting fluid to and receiving fluid from the space formed by and between piston casing and blades, the volume of which space as the piston rotates increases and diminishes.

9. In a machine of the class described the combination of a rotary shaft, a piston integral with the shaft and arranged intermediate the length thereof, said piston consisting of enlarged terminal cylindrical portions and an intermediate cylindrical portion of smaller diameter, a slot extending diametrically through the cylinder throughout the length of the intermediate portion and part way through the length of the terminal portions, a blade of adjustable length extending through said slot and exceeding in its length the diameter of the intermediate portion of the piston, a cylindrical casing enclosing the intermediate portion of said piston with respect to which when the parts are assembled the piston is eccentric, the said casing consisting of an integral cylindrical body and a removable head, together with means (when the parts are assembled) for admitting fluid to and receiving fluid from the space formed by and between piston casing and blades, the volume of which space as the piston rotates increases and diminishes.

10. In a machine of the class described the combination of a rotary shaft carrying a piston integral with itself and a casing forming, together with the piston, a chamber to contain fluid under pressure, a bushing carried in the casing within which, when the parts are assembled, said rotary shaft extends, an oil gland consisting of a chamber formed in the body of the casing and a duct opening from the chamber through the said bushing, a perforate body of plastic material arranged within the chamber abutting upon said bushing and overlying the line of meeting of the body of the casing and the body of the bushing, having its perforation aligned with said duct and means for exerting upon said block of plastic material deforming pressure.

FRITZ EGERSDÖRFER.